United States Patent
Myung et al.

(10) Patent No.: US 12,200,726 B2
(45) Date of Patent: Jan. 14, 2025

(54) METHOD FOR TRANSMITTING AND RECEIVING SIGNAL IN WIRELESS COMMUNICATION SYSTEM, AND DEVICE SUPPORTING SAME

(71) Applicant: LG ELECTRONICS INC., Seoul (KR)

(72) Inventors: Sechang Myung, Seoul (KR); Seonwook Kim, Seoul (KR); Suckchel Yang, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 17/754,357

(22) PCT Filed: Sep. 29, 2020

(86) PCT No.: PCT/KR2020/013333
§ 371 (c)(1),
(2) Date: Mar. 30, 2022

(87) PCT Pub. No.: WO2021/066519
PCT Pub. Date: Apr. 8, 2021

(65) Prior Publication Data
US 2022/0394751 A1 Dec. 8, 2022

(30) Foreign Application Priority Data

| Oct. 4, 2019 | (KR) | 10-2019-0123401 |
| May 13, 2020 | (KR) | 10-2020-0057366 |
| May 14, 2020 | (KR) | 10-2020-0057596 |

(51) Int. Cl.
*H04W 72/23* (2023.01)

(52) U.S. Cl.
CPC ............................ *H04W 72/23* (2023.01)

(58) Field of Classification Search
None
See application file for complete search history.

(56) References Cited

U.S. PATENT DOCUMENTS

| 2017/0311337 A1 | 10/2017 | Mo et al. | |
| 2020/0351861 A1* | 11/2020 | Mukherjee | H04L 1/1864 |
| 2021/0352731 A1* | 11/2021 | Yang | H04W 74/0833 |
| 2022/0368475 A1* | 11/2022 | Lei | H04L 1/1864 |

FOREIGN PATENT DOCUMENTS

| KR | 10-2019-0104986 | 9/2019 |
| WO | 2018-073792 | 4/2018 |

OTHER PUBLICATIONS

PCT International Application No. PCT/KR2020/013333, International Search Report dated Jan. 20, 2021, 4 pages.
Apple Inc., "On enhancements for configuration grant transmissions," R1-1909045, 3GPP TSG-RAN WG1 #98, Aug. 2019, 6 pages.
Huawei et al., "Transmission with configured grant in NR unlicensed band," R1-1903931, 3GPP TSG RAN WG1 Meeting #96bis, Apr. 2019, 21 pages.

* cited by examiner

*Primary Examiner* — Kenny S Lin
(74) *Attorney, Agent, or Firm* — LEE, HONG, DEGERMAN, KANG & WAIMEY

(57) ABSTRACT

Various embodiments of the present disclosure disclose a method for transmitting and receiving a signal in a wireless communication system and an apparatus supporting the same.

12 Claims, 16 Drawing Sheets

(a) Uplink Tx procedure based on dynamic grant (b) Uplink Tx procedure based on configured grant (a) Carrier aggregation between L-band and U-band (b) Standalone U-band(s)

METHOD FOR TRANSMITTING AND RECEIVING SIGNAL IN WIRELESS COMMUNICATION SYSTEM, AND DEVICE SUPPORTING SAME

CROSS-REFERENCE TO RELATED APPLICATIONS

This application is the National Stage filing under 35 U.S.C. 371 of International Application No. PCT/KR2020/013333, filed on Sep. 29, 2020, which claims the benefit of earlier filing date and right of priority to Korean Application Nos. 10-2019-0123401 filed on Oct. 4, 2019, 10-2020-0057366 filed on May 13, 2020, and 10-2020-0057596 filed on May 14, 2020, the contents of which are all hereby incorporated by reference herein in their entireties.

TECHNICAL FIELD

The present disclosure relates to a method and apparatus for transmitting and receiving a signal in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Task

Provided are a method and apparatus for efficiently performing a wireless signal transmission and reception procedure.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

A first aspect of the present disclosure provides a method performed by a UE in a wireless communication system, including receiving carrier information indicating a carrier on which a physical uplink shared channel (PUSCH) will be transmitted, transmitting the PUSCH on the carrier indicated by the carrier information, and receiving a downlink signal including a flag bit indicating whether feedback information on a configured grant (CG)-PUSCH is included, wherein the carrier includes a first carrier configured in a first band or a second carrier configured in a second band different from the first band, the carrier information is received through a higher layer signal or downlink control information (DCI), and whether to monitor the feedback information on the CG-PUSCH is determined based on the carrier information.

A second aspect of the present disclosure provides a UE used in a wireless communication system, including at least one transceiver, at least one processor, and at least one computer memory operatively coupled to the at least one transceiver and the at least one processor, and when executed, causing the at least one transceiver and the at least one processor to perform operations, wherein the operations include receiving carrier information indicating a carrier on which a physical uplink shared channel (PUSCH) will be transmitted, transmitting the PUSCH on the carrier indicated by the carrier information, and receiving a downlink signal including a flag bit indicating whether feedback information on a configured grant (CG)-PUSCH is included, wherein the carrier includes a first carrier configured in a first band or a second carrier configured in a second band different from the first band, the carrier information is received through a higher layer signal or downlink control information (DCI), and whether to monitor the feedback information on the CG-PUSCH is determined based on the carrier information.

A third aspect of the present disclosure provides a device for a UE, including at least one processor and at least one computer memory operatively coupled to the at least one processor and, when executed, causing the at least one processor to perform an operation, wherein the operation includes receiving carrier information indicating a carrier on which a physical uplink shared channel (PUSCH) will be transmitted, transmitting the PUSCH on the carrier indicated by the carrier information, and receiving a downlink signal including a flag bit indicating whether feedback information on a configured grant (CG)-PUSCH is included, wherein the carrier includes a first carrier configured in a first band or a second carrier configured in a second band different from the first band, the carrier information is received through a higher layer signal or downlink control information (DCI), and whether to monitor the feedback information on the CG-PUSCH is determined based on the carrier information.

A fourth aspect of the present disclosure provides a processor-readable medium storing one or more instructions for causing at least one processor to perform an operation, the operation including receiving carrier information indicating a carrier on which a physical uplink shared channel (PUSCH) will be transmitted, transmitting the PUSCH on the carrier indicated by the carrier information, and receiving a downlink signal including a flag bit indicating whether feedback information on a configured grant (CG)-PUSCH is included, wherein the carrier includes a first carrier configured in a first band or a second carrier configured in a second band different from the first band, the carrier information is received through a higher layer signal or downlink control information (DCI), and whether to monitor the feedback information on the CG-PUSCH is determined based on the carrier information.

Preferably, the downlink signal may not include the feedback information on the CG-PUSCH based on the flag bit being 0, and the downlink signal may include the feedback information on the CG-PUSCH based on the flag bit being 1.

Preferably, the PUSCH may be transmitted on the first carrier based on the carrier information indicating the first carrier and the carrier information being received through the higher layer signal, and the flag bit may be 0.

Preferably, the UE may not monitor the feedback information on the CG-PUSCH.

Preferably, based on the carrier information indicating the second carrier and being received through the higher layer signal, the PUSCH may be a CG-PUSCH transmitted on the second carrier, and the flag bit may be 1 bit.

Preferably, the UE may monitor the feedback information on the CG-PUSCH based on the value of the flag bit being "1".

Preferably, based on the carrier information indicating the first carrier and being indicated through the DCI, the PUSCH may be transmitted on the first carrier, and the UE may not monitor the feedback information on the CG-PUSCH.

Preferably, based on the carrier information indicating the second carrier and being indicated through the DCI, the PUSCH may be a CG-PUSCH transmitted on the second carrier, and the UE may monitor the feedback information on the CG-PUSCH.

Preferably, monitoring the feedback information on the CG-PUSCH may include monitoring a bitmap index corresponding to a hybrid automatic repeat and request (HARQ) process ID for the second carrier.

Preferably, the first band may be a licensed band, and the second band may be an unlicensed band.

A device applied to embodiments of the present disclosure may include an autonomous vehicle.

The above-described aspects of the present disclosure are only some of the preferred embodiments of the present disclosure, and various embodiments in which the technical features of the present disclosure are reflected can be derived and understood by those of ordinary skill in the art based on detailed description of the present disclosure which will be described below.

Advantageous Effects

According to embodiments of the present disclosure, a signal may be efficiently transmitted and received in a wireless communication system.

According to embodiments of the present disclosure, an efficient signal transmission method considering the characteristics of an unlicensed band is provided.

According to embodiments of the present disclosure, it is possible to efficiently identify downlink control information (DCI) for activation/release of a configured grant and DCI for downlink feedback information (DFI) for an uplink signal transmitted in a configured grant resource.

According to the embodiments of the present disclosure, it is possible to efficiently monitor DFI for an uplink signal transmitted in a configured grant resource.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
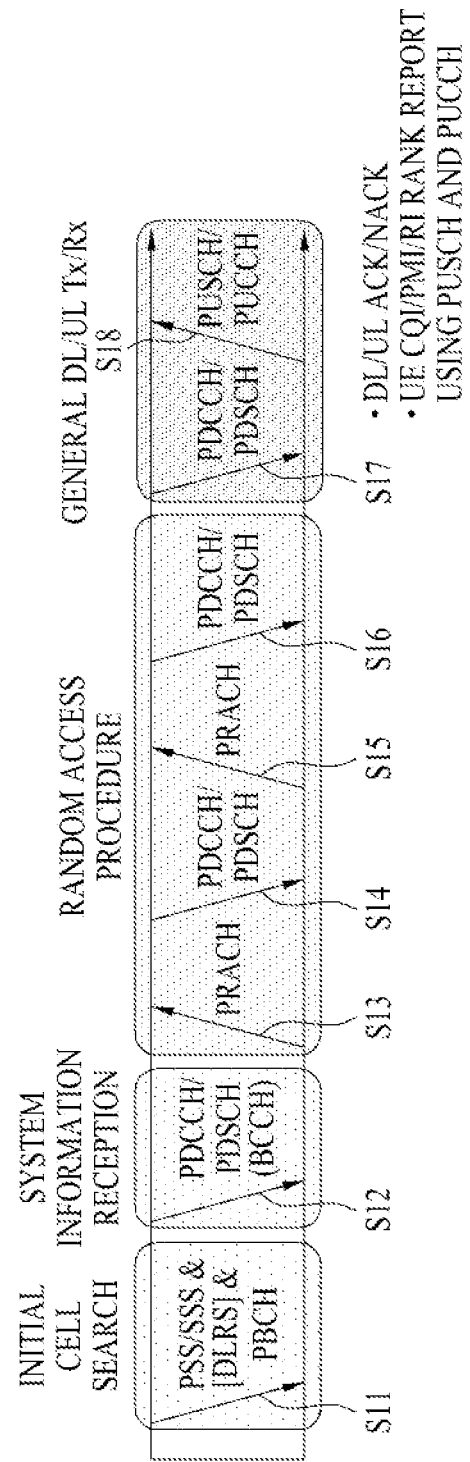
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
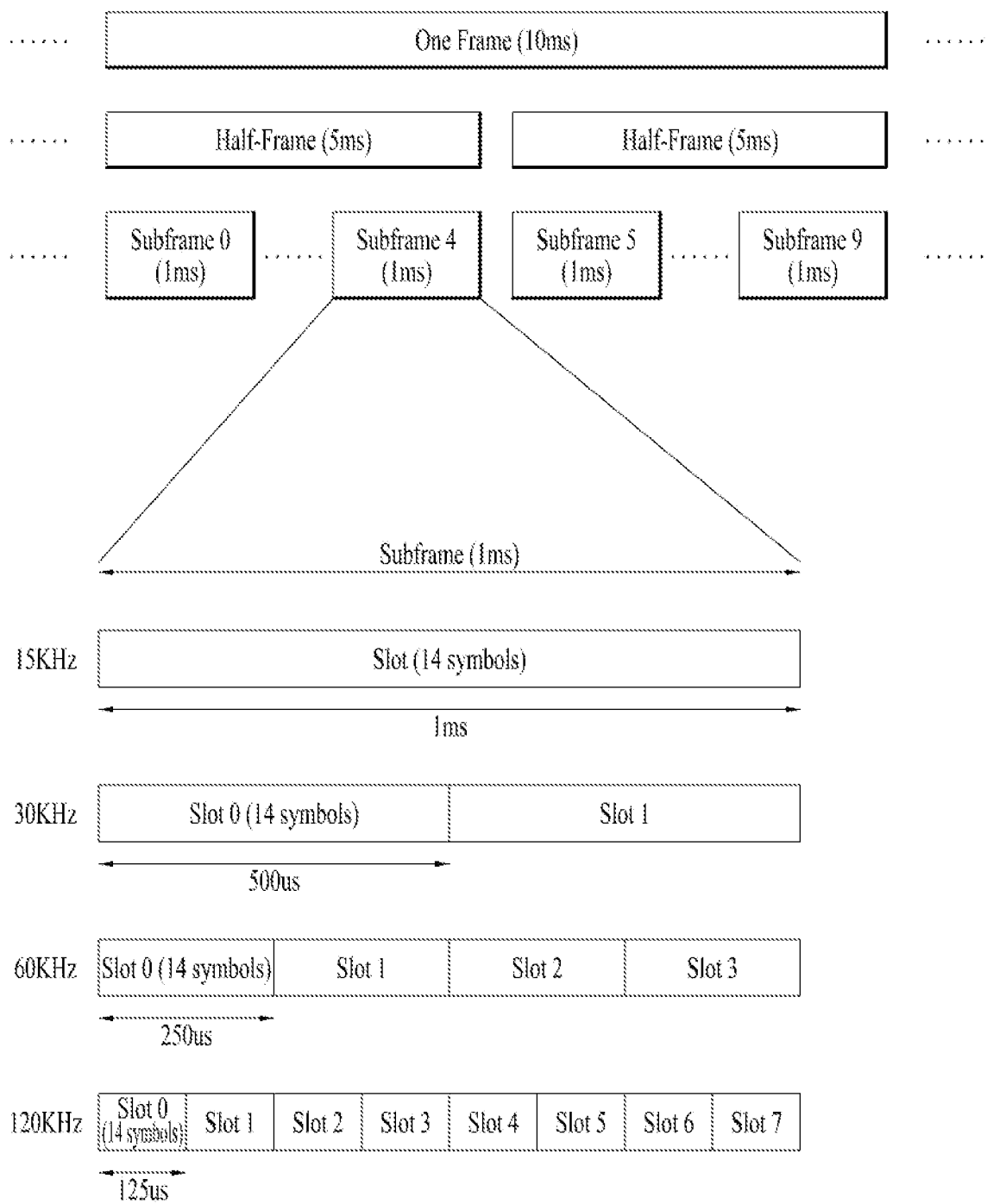
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: number of slots in a frame
*$N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
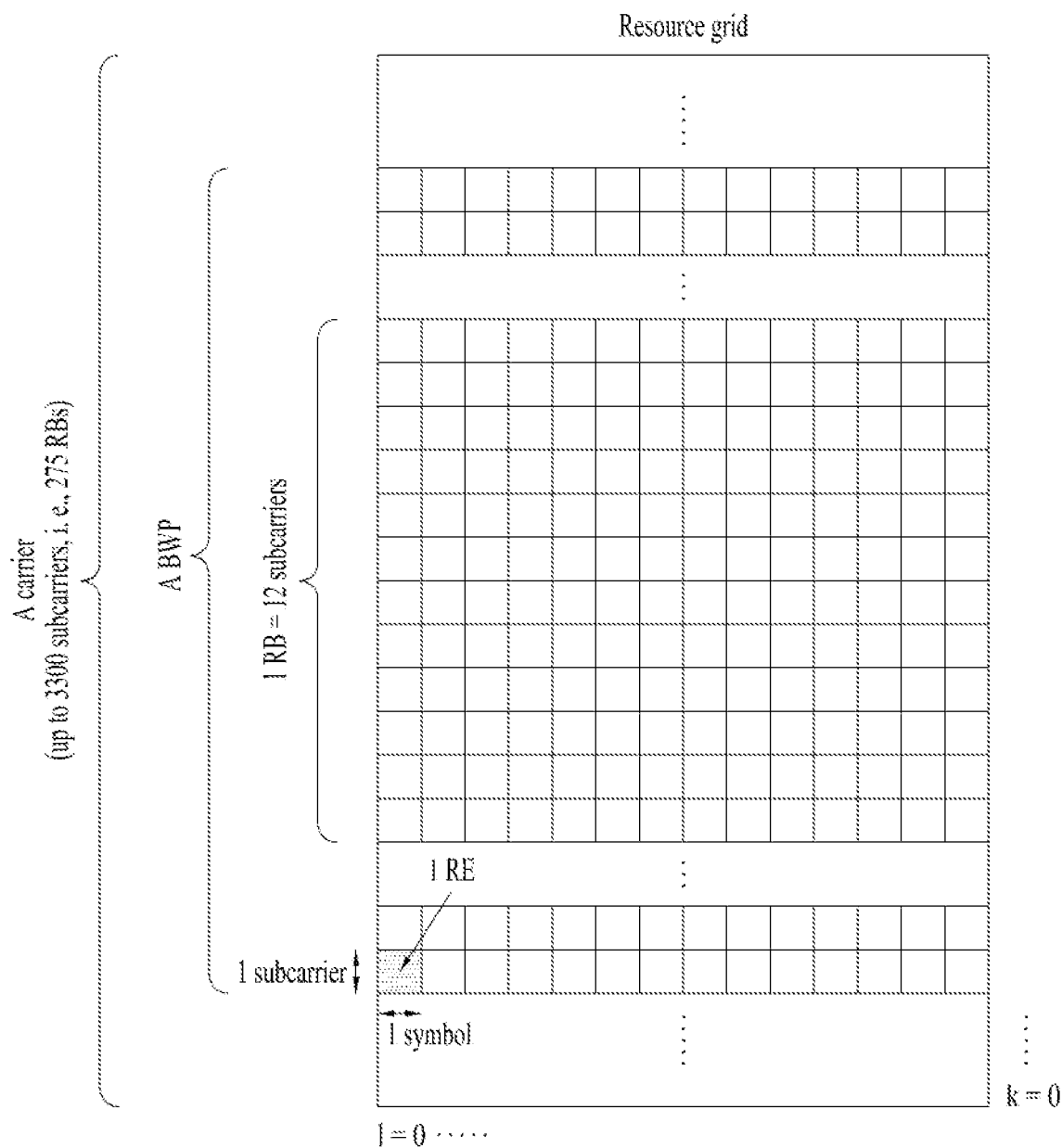
FIG. 3 illustrates a resource grid during the duration of a slot.

FIG. 3 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
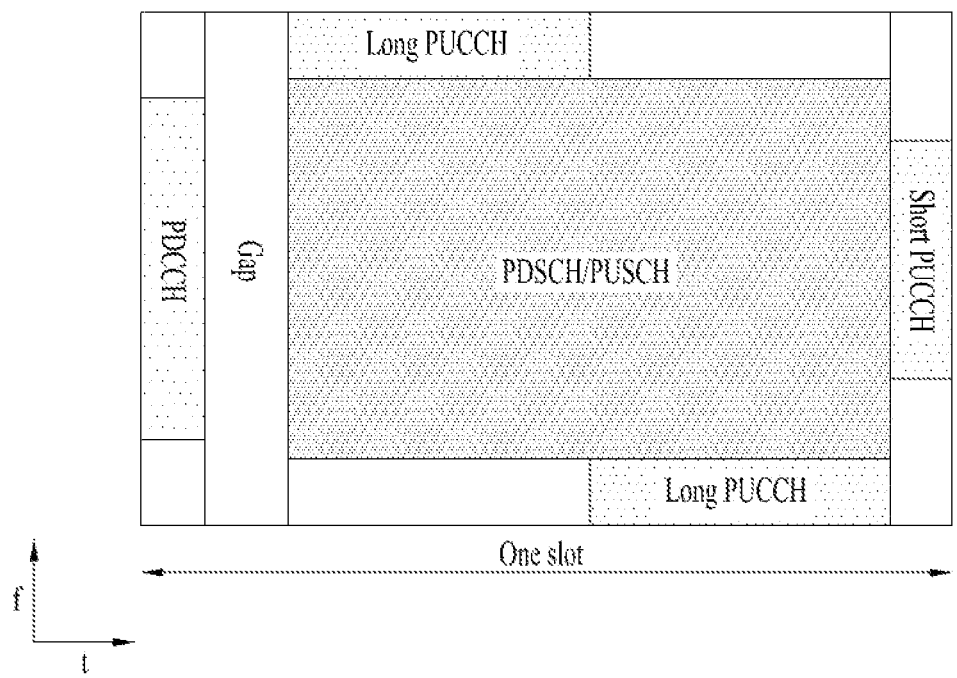
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.
  searchSpaceId: indicates the ID of the SS set.
  controlResourceSetId: indicates a CORESET associated with the SS set.
  monitoringSlotPeriodicityAndOffset: indicates a PDCCH monitoring periodicity (in slots) and a PDCCH monitoring offset (in slots).
  monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
  nrofCandidates: indicates the number of PDCCH candidates (e.g., one of 0, 1, 2, 3, 4, 5, 6, and 8) for each AL={1, 2, 4, 8, 16}.
  searchSpaceType: indicates whether the SS type is CSS or USS.
  DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PUCCH delivers uplink control information (UCI). The UCI includes the following information.
  SR: information used to request UL-SCH resources.
  HARQ-ACK: a response to a DL data packet (e.g., codeword) on the PDSCH. A HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
  CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 5:
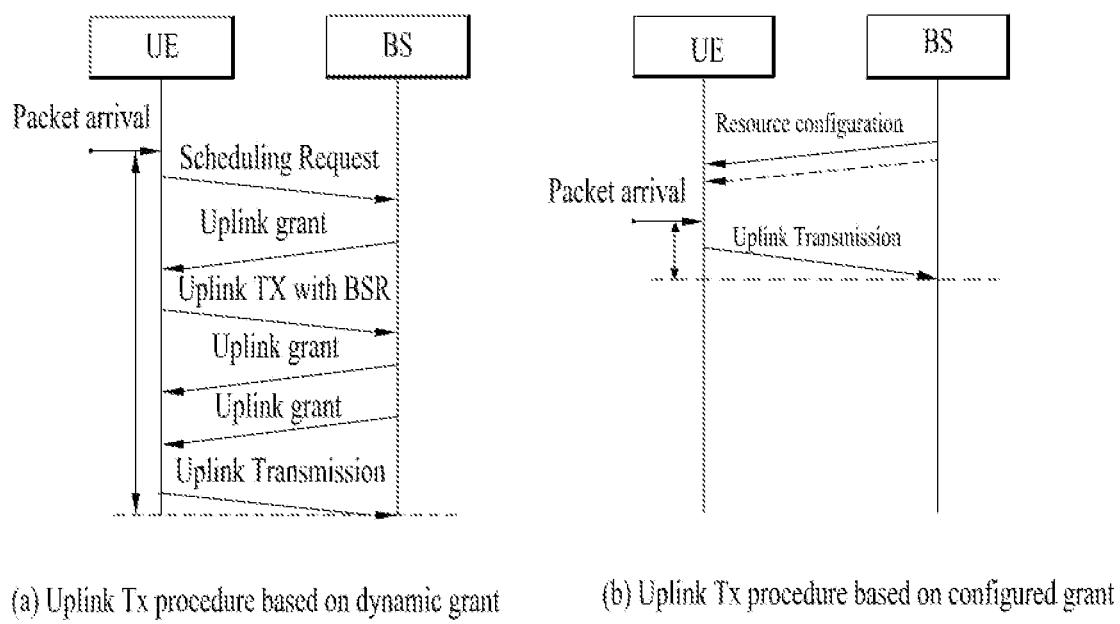
FIG. 5 illustrates exemplary uplink (UL) transmission operations of a user equipment (UE)

FIG. 5 illustrates exemplary UL transmission operations of a UE. The UE may transmit an intended packet based on a DG (FIG. 5(a)) or based on a CG (FIG. 5(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 6:
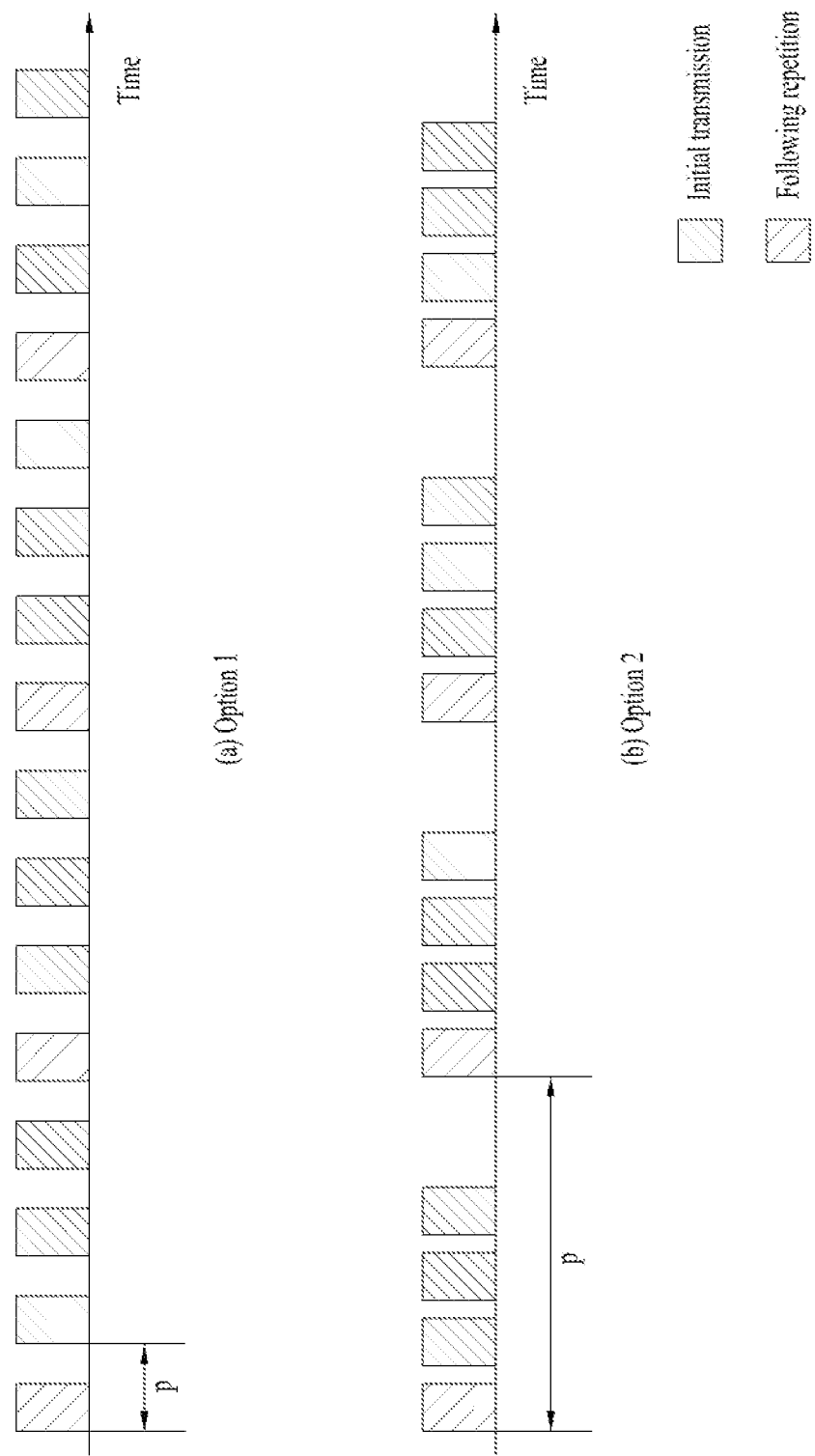
FIG. 6 illustrates exemplary repeated transmissions based on a configured grant.

FIG. 6 illustrates exemplary repeated transmissions based on a CG.

The UE performs repeated transmissions until one of the following conditions is satisfied:
A UL grant for the same TB is successfully received;
The repetition number of the TB reaches K; and
(In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

Embodiments of the Present Disclosure

Figure 7:
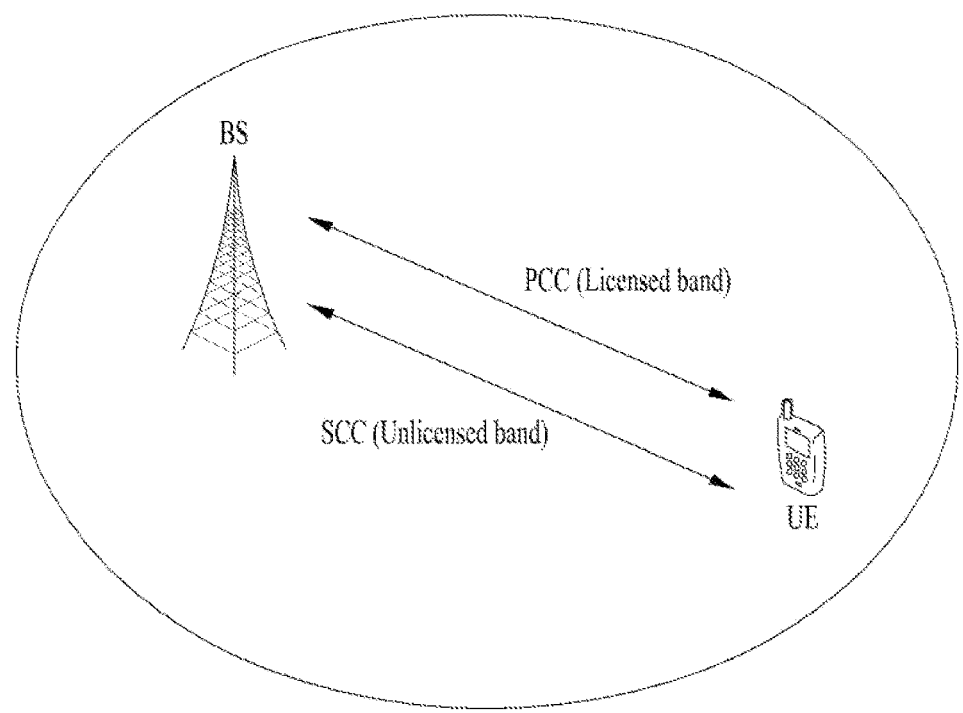
FIG. 7 illustrates a wireless communication system supporting an unlicensed band.
Figure 7:
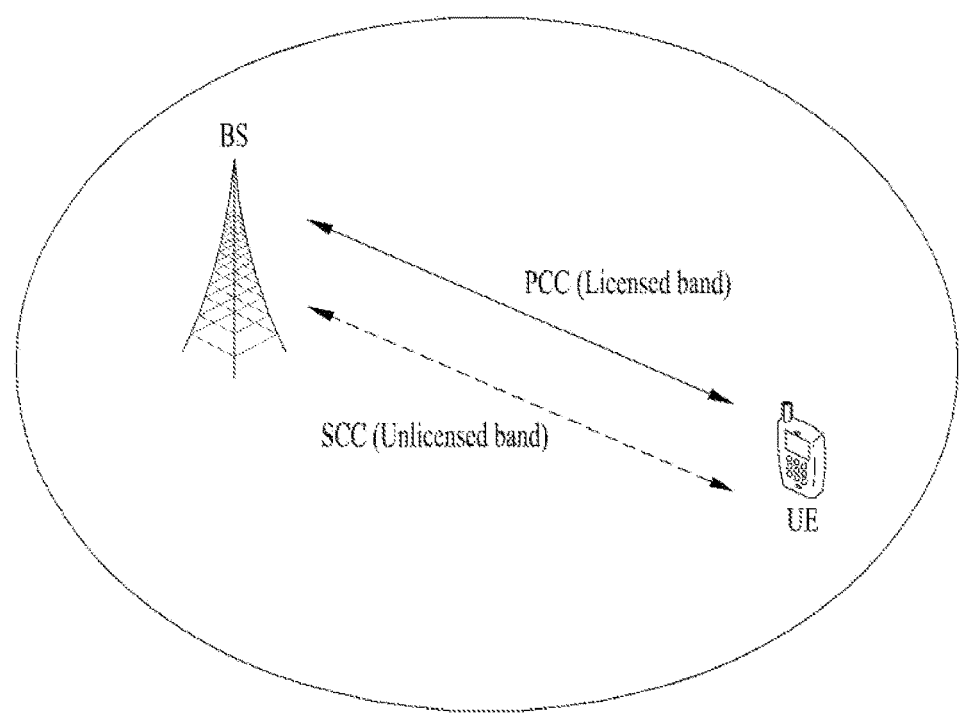

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 μs. The BS or the UE senses the slot during a sensing slot duration. When power detected for at least 4 μs within the sensing slot duration is less than an energy detection threshold XThresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 μs, the gap duration may be counted in a COT. The COT may be shared for transmission between the BS and corresponding UE(s).

DL transmission burst: a set of transmissions without any gap greater than 16 μs from the BS. Transmissions from the BS, which are separated by a gap exceeding 16 μs are considered as separate DL transmission bursts. The BS may perform transmission(s) after a gap without sensing channel availability within a DL transmission burst.

UL transmission burst: a set of transmissions without any gap greater than 16 μs from the UE. Transmissions from the UE, which are separated by a gap exceeding 16 μs are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 8:
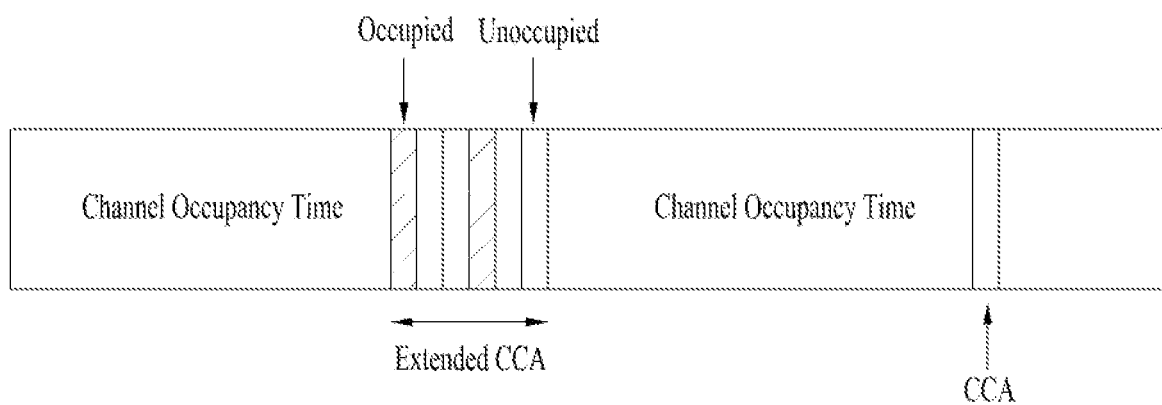
FIG. 8 illustrates an exemplary method of occupying resources in an unlicensed band.

FIG. 8 illustrates an exemplary method of occupying resources in an unlicensed band.

Referring to FIG. 8, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

| | Type | Explanation |
|---|---|---|
| DL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 9:
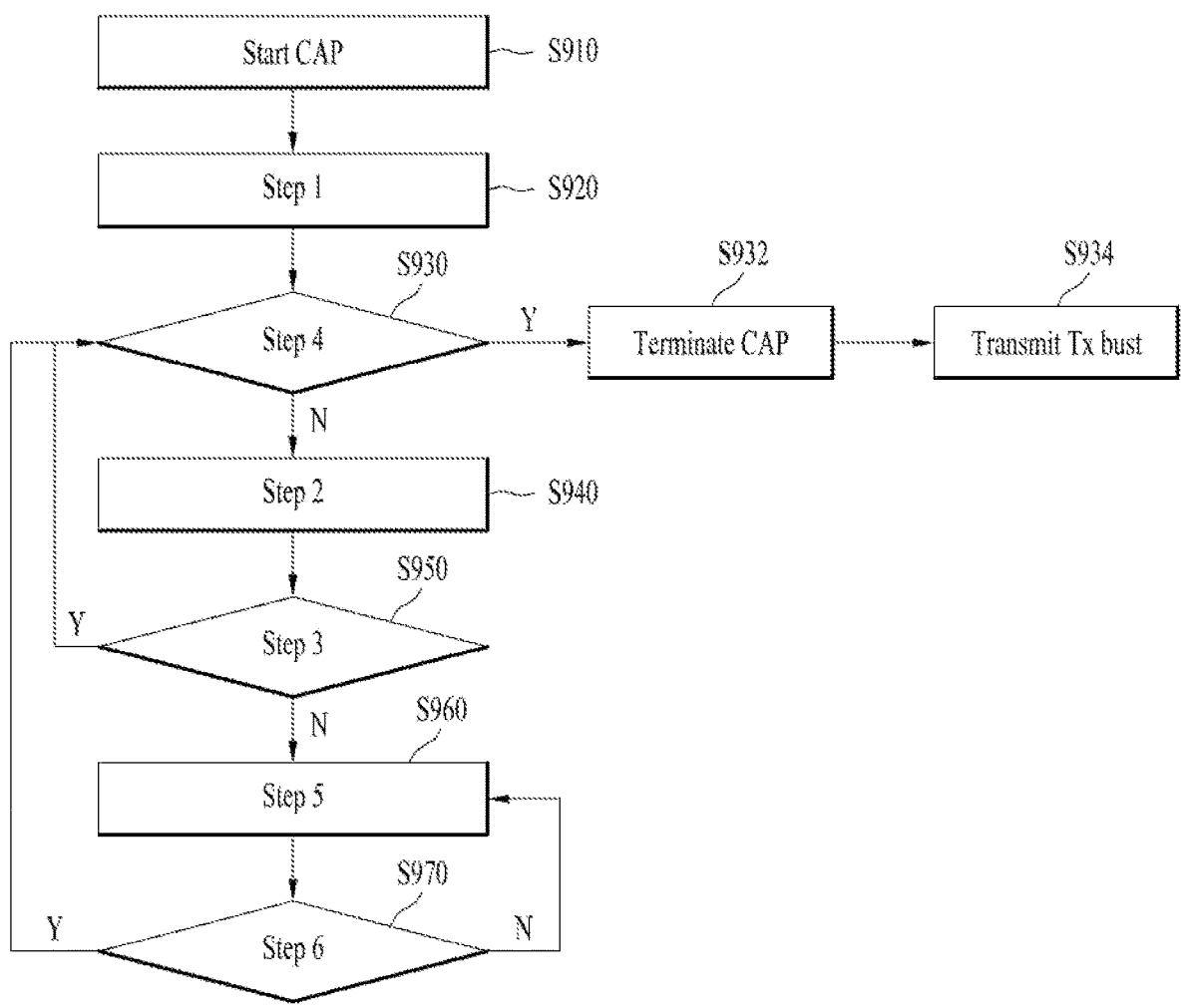
FIG. 9 illustrates an exemplary channel access procedure of a UE for UL signal transmission in an unlicensed band applicable to the present disclosure.

FIG. 9 illustrates a Type 1 CAP among CAPs of a UE for a UL signal transmission in an unlicensed band applicable to the present disclosure.

Referring to FIG. 9, the UE may sense whether a channel is idle for a sensing slot duration in a defer duration Td. After a counter N is decremented to 0, the UE may perform a transmission (S934). The counter N is adjusted by sensing the channel for additional slot duration(s) according to the following procedure.

Step 1) Set N=Ninit where Ninit is a random number uniformly distributed between 0 and CWp, and go to step 4 (S920).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y) (S930), stop CAP (S932). Else (N), go to step 2.

Step 5) Sense the channel until a busy sensing slot is detected within the additional defer duration Td or all slots of the additional defer duration Td are sensed as idle (S960).

Step 6) If the channel is sensed as idle for all slot durations of the additional defer duration Td (Y), go to step 4. Else (N), go to step 5 (S970).

Table 8 illustrates that mp, a minimum CW, a maximum CW, a maximum channel occupancy time (MCOT), and an allowed CW size applied to a CAP vary according to channel access priority classes.

TABLE 8

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 μs) immediately followed by $m_p$ consecutive slot durations where each slot duration $T_{sl}$ is 9 μs, and $T_f$ includes a sensing slot duration $T_{sl}$ at the start of the 16-μs duration.

$CW_{min,p} \leq CW_p \leq CW_{max,p}$. $CW_p$ is set to $CW_{min,p}$, and may be updated before Step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 $T_{short\_dl}$ includes a duration $T_f$ (=16 μs) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$ (=16 μs). In the Type 2B UL CAP, $T_f$ includes a sensing slot within the last 9 μs of the duration. In the Type 2C UL CAP, the UE does not sense a channel before a transmission.

Hereinafter, the present disclosure proposes a method of making the size of DCI to be used when a base station feeds back a HARQ-ACK result with CG-DFI for a configured grant (CG)-PUSCH transmitted by a UE identical to DCI used for activation/deactivation (or release) of configured grant transmission in a wireless communication system composed of a base station and a UE supporting an unlicensed band. Accordingly, it is possible to efficiently identify DCI for activation/release of configured grant transmission and DCI for CG-DFI while reducing the burden of blind detection of the UE.

In addition, the present disclosure proposes a method of efficiently monitoring CG-DFI for a CG-PUSCH based on a field for the CG-DFI being additionally present in DCI.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

In LTE LAA, the BS may inform the UE of an autonomous uplink (AUL) subframe or slot for autonomous UL transmission, in which the UE may transmit UL data without receiving a UL grant, through an X-bit bitmap (e.g., X=40 bits).

When autonomous transmission activation is indicated to the UE, the UE may transmit UL data in a subframe or slot indicated through a related bitmap even without receiving the UL grant. Upon transmitting a PDSCH to the UE, the BS also transmits a PDCCH, which is scheduling information required for decoding. Likewise, upon transmitting a PUSCH on AUL to the BS, the UE also transmits AUL UCI, which is information required when the BS decodes the PUSCH. The AUL UCI includes information needed to receive an AUL PUSCH, such as a HARQ ID, a new data indicator (NDI), a redundancy version (RV), an AUL subframe starting position, and an AUL subframe ending position, and information for sharing a UE-initiated COT with the BS. "Sharing a UE-initiated COT with the BS" means an operation of assigning a part of a channel occupied by the UE through random backoff-based category 4 LBT (or Type 1 CAP) to the BS and transmitting a PDCCH (and a PDSCH) on the channel by the BS, when the channel is idle as a result of one-shot LBT of 25 μsec (based on a timing gap resulting from the UE's emptying of the last symbol).

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

AUL of LTE LAA and a CG of NR show a big difference in terms of a method of transmitting HARQ-ACK feedback for a PUSCH that the UE has transmitted without receiving a UL grant and in terms of the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 μs, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 μs may correspond to the above-described Type 2A CAP, and Cat-2 LBT with a minimum sensing duration of 16 μs may correspond to the above-described Type 2B CAP. The minimum sensing durations are merely exemplary, and a minimum sensing duration less than 25 μs or 16 μs (e.g., a minimum sensing duration of 9 μs) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are defined as follows.

UCI: control information transmitted on UL by the UE. UCI includes various types of control information (i.e., UCI types). For example, the UCI may include a HARQ-ACK (simply, A/N or AN), an SR, and CSI.

PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.

UL grant DCI: DCI for a UL grant. For example, UL grant DCI means DCI formats 0_0 and 0_1, and is transmitted on a PDCCH.

DL assignment/grant DCI: DCI for a DL grant. For example, DL assignment/grant DCI means DCI formats 1_0 and 1_1, and is transmitted on a PDCCH.

PUSCH: a physical layer UL channel for UL data transmission.

Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.

Performing LBT for channel X/with respect to channel X: This means that performing LBT in order to confirm whether to transmit channel X. For example, a CAP may be performed before transmission of channel X is started.

Downlink feedback information (DFI): This means a PDSCH decoding result transmitted from a base station to a UE for a PUSCH transmitted from the UE to the base station.

When the UE transmits an AUL PUSCH in feLAA (further enhanced LAA), the base station transmits a HARQ-ACK result through AUL-DFI using a bitmap for each of 16 HARQ process IDs including not only AUL HARQ process IDs but also a feedback result for a dynamic scheduling PUSCH. In addition, by designing a different field configuration in the same DCI format as AUL-DFI to identify AUL activation/release and DFI, the burden of blind detection of the UE is reduced.

Even in NR-U, the base station may transmit a feedback result (HARQ-ACK) for a CG-PUSCH transmitted by the UE through CG-DFI. Complexity of UE implementation may be reduced by allowing the CG-DFI to have the same size as an existing DCI format in order not to create an additional blind detection burden on the UE and designing specific fields in the DCI format to identify CG activation/release and DFI.

Therefore, the present disclosure proposes methods #1 to #4 for making the size of DCI to be used when a base station feeds back a HARQ-ACK result with CG-DFI for a CG-PUSCH transmitted by a UE in an unlicensed band identical to the size of DCI used for activation/release of configured grant transmission to reduce the burden of blind detection of the UE and to allow the DCI for different purposes to be effectively identified.

Further, the present disclosure proposes method #5 for efficiently monitoring CG-DFI based on an additional field for identifying CG-DFI and a method for configuring a PUSCH transmission carrier.

Prior to description of the proposed methods, the PDCCH/DCI includes a cyclic redundancy check (CRC), and the CRC is masked/scrambled with various identifiers (e.g., radio network temporary identifier (RNTI)) according to the owner or purpose of the PDCCH. For example, if the PDCCH is for a specific UE, the CRC is masked with a cell-RNTI (C-RNTI). If the PDCCH is for semi-persistent scheduling (SPS), the CRC is SPS-C-RNTI, and if the PDCCH is for a configured grant, the CRC is masked with a configured scheduling-RNTI (CS-RNTI)).

As defined above, downlink feedback information (DFI) means a PUSCH decoding result transmitted by a base station to a UE for a PUSCH transmitted by the UE to the base station and may be transmitted through DCI. For example, DCI format 0_1 may include CG-DFI regarding a CG-PUSCH.

In feLAA AUL, AUL-DFI and AUL activation/deactivation are identified by introducing an additional AUL-C-RNTI rather than SPS-C-RNTI and using the first bit field in a UL grant as a flag bit. Activation and release DCI for configured grant type 2 is identified by reusing C-RNTI in an NR configured grant and setting a HARQ process number and a redundancy version (RV) field in a DCI format to a specific bit (e.g., set to all "0"s or "1") (refer to 3GPP TS 38.213).

The base station does not explicitly transmit HARQ-ACK feedback for a PUSCH transmitted by the UE through a configured grant resource in an NR configured grant, but in an NR-U configured grant, the base station may feed back a CG-PUSCH decoding result to the UE through CG-DFI similar to AUL-DFI. Therefore, in addition to activation/release of the configured grant type 2, CG-DFI needs to be identified.

[Proposed method #1] Method of identifying configured grant activation/release by reusing fields used for PDCCH validation for DL SPS and configured grant type 2 in NR in DCI in which CRC is scrambled with a CS-RNTI and identifying CG-DFI by setting NDI, HARQ ID, and RV as follows.

(1) Method 1-1: Method of using HARQ ID and/or RV field

TABLE 9

| | |
|---|---|
| Activation | NDI: set to "0" |
| | HARQ process number: set to all "0"s |
| | RV: set to "00" |
| Release | NDI: set to "0" |
| | HARQ process number: set to all "0"s |
| | RV: set to "00" |
| | MCS: set to all "1"s |
| | FDRA (frequency domain resource assignment): set to all "1"s |
| CG-DFI | NDI: set to "0" |
| | HARQ process number: set to all "1"s or partially set to "1"s |
| | RV: set to all "1"s or partially set to "1"s |
| Retransmission scheduling | NDI: set to "1" |

(2) Method 1-2: Method of using NDI and/or RV or FDRA field

TABLE 10

| | |
|---|---|
| Activation | NDI: set to "0" |
| | HARQ process number: set to all "0"s |
| | RV: set to "00" |
| Release | NDI: set to "'0" |
| | HARQ process number = set to all "0"s |
| | RV = set to "00", MCS = set to all "1"s |
| | FDRA: set to all "1"s |
| CG-DFI | NDI: set to "1" and RV: set to "1" (that is, retransmission is permitted only when RV = 0/2/3. Here, the RV value of "1" means that interpretation of a 2-bit field assigned to RV indication corresponds to 1 among RV values 0/1/2/3.) |
| | NDI = set to "1" and FDRA: set to all "1"s (RA type 1) |
| | NDI = set to "1" and FDRA: set to all "0"s (RA type 0) |
| Retransmission scheduling | NDI = set to "1" and not CG-DFI |

However, the bits used CG-DFI validation in the above methods (for example, all or some bits of the NDI field and HARQ and/or all or some bits of RV in method 1-1) and a carrier indicator field (CIF) are excluded from DFI contents mapping may be discontinuous during HARQ-ACK mapping.

Proposed method #1 is a method of identifying CG-DFI by setting a HARQ process number and/or an RV field value or NDI and/or the RV or FDRA field differently from (de)activation DCI while reusing the method of identifying activation and release of configured grant type 2 for the DCI format in which CRC is scrambled with CS-RNTI in the NR configured grant, that is, the method of setting the NDI, HARQ process number, and RV field value to specific bits.

Method 1-1 is a method of identifying (de)activation and CG-DFI by setting the NDI field to "0" like (de)activation and setting all or some bits of the HARQ process number field to "1". It is a method of identifying (de)activation and CG-DFI by using ID and/or the RV field. Method 1-2 is a method of identifying (de)activation and CG-DFI by setting the NDI field and the RV field to 1 or setting the NDI field to 1 and setting the FDRA RA field to all is or 0s.

[Proposed method #2] Method of identifying activation/release of configured grant type 2 or identifying CG-DFI by using "UL-SCH indicator" field in DCI format 0_1 in which CRC is scrambled with CS-RNTI to reuse fields used for PDCCH validation for DL SPS and configured grant type 2 in NR (1) Method 2-1: Method of identifying CG-DFI according to whether the "UL-SCH indicator" field is 0 or 1

TABLE 11

| | |
|---|---|
| Activation | NDI: set to "0" |
| | UL-SCH indicator = set to "1" |
| | HARQ process number = set to all "0"s |
| | RV = set to "00" |
| Release | NDI: set to "0" |
| | UL-SCH indicator: set to "1" |
| | HARQ process number: set to all "0"s |
| | RV: set to "00" |
| | MCS: set to all "1"s |
| | FDRA: set to all "1"s |
| CG-DFI | UL-SCH indicator: set to "0" |
| Retransmission scheduling | NDI: set to "1" |
| | UL-SCH indicator: set to "1" |

(2) Method 2-2: Method of identifying activation/release or DFI through the UL-SCH field when the NDI field is 1

TABLE 12

| | |
|---|---|
| Activation | NDI: set to "0" |
| | HARQ process number: set to all "0"s |
| | RV: set to "00" |
| Release | NDI: set to "0" |
| | HARQ process number: set to all "0"s |
| | RV: set to "00" |
| | MCS: set to all "1"s |
| | FDRA: set to all "1"s |
| CG-DFI | NDI: set to "1" |
| | UL-SCH indicator: set to "0" |
| Retransmission scheduling | NDI: set to "1" |
| | UL-SCH indicator: set to "1" |

However, the bits used for CG-DFI validation in the above methods (for example, the UL-SCH indicator field in Method 2-1 and the NDI and UL-SCH indicator fields in Method 2-2) and the carrier indicator field (CIF) are excluded from DFI contents mapping and may be discontinuous during HARQ-ACK mapping.

Proposed method #2 is a method of identifying (de) activation and CG-DFI by additionally using a 1-bit UL-SCH indicator field while reusing the method of identifying activation and release of configured grant type 2 for the DCI format in which CRC is scrambled with CS-RNTI in the NR configured grant, that is, the method of setting the NDI, HARQ process number, and RV field value to specific bits.

According to method 2-1, the UL-SCH indicator field indicates DCI for activation/release of the existing NR configured grant when set to "1" and indicates DCI for CG-DFI when set to "0". According to method 2-2, the method for the NR configured grant is reused and NDI is set to "1" to indicate DCI for activation/release of the configured grant, the UL-SCH indicator is set to "0" to indicate DCI for CG-DFI, and the UL-SCH indicator is set to "1" to indicate DCI for retransmission scheduling.

[Proposed method #3] Method of identifying activating/release of a configured grant and CG-DFI using bits of a specific (first or last) field of the DCI format in which CRC is scrambled with CS-RNTI or C-RNTI as a flag In this proposed method, bits used for CG-DFI validation and the carrier indicator field (CIF) are excluded from DFI contents mapping and may be discontinuous during HARQ-ACK mapping.

For example, when a PDCCH for DL SPS and configured grant type 2 is validated in NR, DCI format 0_0/0_1 and DCI format 1_1 are identified using the first field of the DCI format, "Identifier for DCI formats". Therefore, in the case of a cell in which DL SPS is not configured, the DCI format 0_0/0_1 field configuration is reused when the PDCCH for configured grant type 2 is validated if "Identifier for DCI formats"=set to "0", and if "Identifier for DCI formats"=set to "1", it is interpreted as CG-DFI to identify (de)activation and CG-DFI DCI.

As another example, the last bit among valid bits in the DCI format or the last bit among all bits including padding bits may be used as a flag for identifying activation/release DCI and CG-DFI DCI.

As another example, LBT-related parameters (e.g., LBT type, LBT priority class, etc.) may be used. For example, if the LBT priority class field is "00", it can indicate CG-DFI, and if the LBT priority class field is "11", it may indicate activation/release DCI.

In the flag utilization method corresponding to the above examples, the flag may replace the UL-SCH indicator field of method 2-1 and method 2-2 of proposed method #2.

[Proposed method #4] Method of identifying configured grant activation/release and CG-DFI through a specific field combination of a DCI format in which CRC is scrambled with CS-RNTI or C-RNTI When certain fields are combined for each DCI format, whether the combined field indicates activation/deactivation/CG-DFI may be defined/set/indicated in advance by RRC and DCI or a combination thereof. In this proposed method, bits used for CG-DFI validation and the carrier indicator field (CIF) are excluded from DFI contents mapping and may be discontinuous during HARQ-ACK mapping.

This proposed method is a method of identifying configured grant activation/release and CG-DFI by combining specific fields among fields constituting DCI format 0_0 or DCI format 0_1. Here, when certain fields in a specific DCI format are combined, whether the combined field identifies activation/deactivation or CG-DFI may be appointed or set/indicated in advance by a base station.

For example, when CSI request=set to all "0"s and UL-SCH indicator=set to "0" in DCI format 0_1, a UE may recognize the corresponding DCI as CG-DFI, and an existing method may be reused for activation/deactivation of configured grant type 2. As another example, when the SRS request field is set to all "0"s in DCI format 0_1 and the UL-SCH indicator is set to "0", the UE may recognize the corresponding DCI as CG-DFI, and an existing method may be reused for activation/release of configured grant type 2.

Hereinafter, a CG-DFI monitoring method of a UE according to a carrier on which a PUSCH is transmitted is proposed.

Since the UL power of a UE is generally lower than the DL power of a base station, cell coverage in the UL direction is less than that in the DL direction. Therefore, UL performance of UEs located at a cell edge may deteriorate. As a method for solving this, a carrier having a frequency much lower than the original UL frequency may be set and used as a secondary UL carrier. Since the frequency of the carrier is inversely proportional to the cell coverage, the lower the frequency, the greater the cell coverage. The base station may instruct a UE to perform UL transmission using a secondary or supplementary UL carrier (SUL) when the condition of a channel is not good.

In a structure configured such that an SUL operates in a licensed band and a non-supplementary UL carrier or normal UL carrier (NUL) operates in an unlicensed band, a PUSCH transport carrier is one of the NUL and the SUL and may be semi-statically configured by a higher layer signal such as RRC or dynamically switched with an L1 signal such as DCI. At a time, there is one PUSCH transport carrier. When a CG-PUSCH is set to type 1 or type 2, a UE may monitor CG-DFI, and the CG-DFI may include A/N for all (16) HARQ process IDs. That is, in the prior art, when a configured grant is set to a UE, the UE always performs CG-DFI monitoring. Hereinafter, a method by which a UE performs or does not perform CG-DFI monitoring according to which carrier (NUL or SUL) is configured for PUSCH transmission and in what manner (semi-static or dynamic) the carrier for PUSCH transmission is configured for efficient CG-DFI monitoring is proposed.

Prior to description of the proposed method, DCI format 0_1 may be used to schedule a PUSCH for a UE or to indicate CG-DFI to the UE. Whether the corresponding DCI is DCI for activating configured grant type 2 or DCI for CG-DFI can be identified through the DFI flag field in DCI format 0_1. For example, the DFI flag field may be bit "0" or "1", a bit value of "0" indicates activation of configured grant type 2, and a bit value of "1" indicates CG-DFI.

Proposed method #5 is a CG-DFI monitoring method of a UE according to which carrier is configured as a PUSCH transport carrier and in what way the configuration is indicated in a situation in which a SUL is configured as a UL carrier operating in a licensed band, a NUL is configured as a UL carrier operating in an unlicensed band, and a CG is configured for the NUL.

[Proposed method #5] In NR-U NUL (U-band) and NR SUL (L-band) structures, a UE may operate as follows.
5-1. Method of Setting Whether UE Performs CG-DFI Monitoring (1) When a PUSCH transport carrier is semi-statically configured as one of a NUL and a SUL for a UE through a higher layer signal (e.g., RRC), a CG-DFI monitoring operation of the UE may be set depending on whether the configured PUSCH transport carrier is a SUL or a NUL.

If the carrier configured as the PUSCH transport carrier of the UE is a SUL, the DFI flag of DCI format 0_1 is a bit "0" and the UE does not perform CG-DFI monitoring. That is, when the PUSCH transport carrier is configured as a SUL through a higher layer signal, the UE does not perform CG-DFI monitoring even if a CG-PUSCH is configured in a NUL.

When the carrier configured as the PUSCH transport carrier of the UE is a NUL and the CG-PUSCH is configured in the NUL, the DFI flag of DCI format 0_1 is bit "1" and the UE performs CG-DFI monitoring.

(2) When the PUSCH transport carrier is dynamically configured as one of a NUL and a SUL for the UE through a physical layer signal such as DCI, the CG-DFI monitoring operation of the UE may be set depending on whether the configured PUSCH transport carrier is a SUL or a NUL.

If the carrier configured as the PUSCH transport carrier of the UE is a SUL, the UE does not expect "ON" of the DFI flag. That is, the UE expects "OFF" of the DFI flag, and as a result, the UE does not perform DFI monitoring. For example, a CG-PUSCH may be transmitted in a SUL, but CG-UCI is not included therein unlike a CG-PUSCH transmitted in an unlicensed band, and thus even DCI including a feedback result for the CG-PUSCH does not include CG-DFI and the DCI will be scrambled with C-RNTI. Accordingly, the UE expects "OFF" of the DFI flag, and as a result, the UE need not perform CG-DFI monitoring.

When the carrier configured as the PUSCH transport carrier of the UE is a NUL and a CG-PUSCH is configured in the NUL, the UE performs CG-DFI monitoring. In this case, monitoring is performed based on a HARQ process ID for the NUL.

There are a total of 16 HARQ process IDs, and A/N values corresponding to the 16 HARQ process IDs may be included in DCI in the form of a 16-bit bitmap. The 16 HARQ process IDs may correspond to bitmap indexes #0 to #15, and a bit value of "1" may indicate ACK, and a bit value of "0" may indicate NACK. All the 16 HARQ process IDs may be used for a dynamic grant, and only some of the 16 HARQ process IDs may be configured for a configured grant. For example, if the configured grant is set, and indexes #0 and #1 are for the configured grant, the bit values corresponding to indexes #0 and #1 are A/N results for a CG-PUSCH, and the values corresponding to the remaining indexes are not for HARQ-ACK operation for the CG-PUSCH (e.g., they are related to CWS control). Therefore, even if the bit value of an index corresponding to a HARQ process ID that is not #0 or #1 is "0" (i.e., NACK), the UE does not perform PUSCH retransmission and waits for a UL grant, but if the bit value of an index corresponding to a HARQ process ID that is #0 or #1 is "0", the UE will retransmit a PUSCH.

According to this proposed method, when a SUL is configured as the PUSCH transport carrier, the PUSCH will be transmitted on the SUL regardless of how SUL is configured as the PUSCH transport carrier (that is, regardless of whether it is configured by a higher layer signal or DCI) and the UE does not perform CG-DFI monitoring.

On the other hand, when the PUSCH transport carrier is a NUL, the NUL is a U-band carrier and a configured grant can effectively operate therein, and thus the DFI monitoring method of the UE may depend on how the NUL has been configured as the PUSCH transport carrier when a configured grant is set in the NUL. For example, if the NUL is configured by a higher layer signal and the UE transmits a CG-PUSCH in the NUL, the UE performs CG-DFI monitoring. In this case, the UE performs monitoring for all HARQ process IDs. On the other hand, if the NUL is configured by DCI and the UE transmits the CG-PUSCH in the NUL, the UE performs CG-DFI monitoring. In this case, the UE performs monitoring only for a HARQ process ID configured for the configured grant.

5-2. Method of Setting HARQ Process IDs

HARQ process IDs may be set such that there are no overlapping HARQ process IDs between a NUL CG-PUSCH and a SUL CG-PUSCH.

For example, some of 16 HARQ process IDs may be set for a configured grant. Since the SUL is a carrier configured in a licensed band, CG-UCI is not present in a PUSCH even if a configured grant is set. Since all the 16 HARQ process IDs can be configured for a licensed band, different IDs are configured as a HARQ process ID for a CG-PUSCH transmitted on the NUL and a HARQ process ID for a (CG-)PUSCH transmitted on the SUL such that they do not overlap.

5-3. Method of Adding CG-UCI Function (When overlapping of HARQ process IDs between a NUL CG-PUSCH and a SUL CG-PUSCH is permitted) a CG function (a CG retransmission timer or the like) of an unlicensed band such as CG-UCI that can indicate a HARQ process ID to a base station may be added to even a SUL CG-PUSCH of a licensed band. The CG function of an unlicensed band refers to a CG-related function present only in unlicensed bands, not in a CG of a licensed band. For example, a CG-PUSCH of an unlicensed band always includes CG-UCI and is transmitted. The CG-UCI includes a HARQ process ID, NDI, RV, and the like, and information necessary to decode the CG-PUSCH is provided to the base station through the CG-UCI. In addition, explicit HARQ-ACK feedback for the CG-PUSCH transmitted by the UE is provided through CG-DFI. If CG-retransmissionTimer is activated after the UE transmits the CG-PUSCH and feedback such as CG-DFI or a UL grant is not received before the timer expires, the UE considers that the base station has not received the CG-PUSCH and can retransmit the CG-PUSCH autonomously through a CG resource.

5-4. Retransmission Methods (1) Method not to allow cross-CC retransmission between a SUL and a NUL
(2) Method of adding a CG function of an unlicensed band such as CG-UCI that can inform a base station of a HARQ process ID to a CG-PUSCH transmitted in a SUL
(3) Method of transmitting retransmission using CG resources configured in a NUL when NACK is fed back with CG-DFI for a CG-PUSCH transmitted in a SUL Since the SUL is a licensed band, LBT for PUSCH transmission is not required and CG-UCI is not included in a PUSCH, whereas the NUL needs to be accompanied by LBT before PUSCH transmission and CG-UCI is transmitted along with a CG-PUSCH. When the CG-PUSCH is dynamically switched after being transmitted in the NUL and retransmitted in the SUL, the CG-PUSCH transmitted in the SUL does not include CG-UCI and thus the base station cannot ascertain information such as a HARQ process ID or NDI. Therefore, it may be configured that cross-CC retransmission is not allowed between the SUL and the NUL. Alternatively, when cross-CC retransmission is allowed, it may be configured that there are no overlapping HARQ process IDs between the NUL and the SUL. Alternatively, even if HARQ process IDs overlap, the CG function (e.g., CG retransmissionTimer) of an unlicensed band such as CG-UCI may be applied to the CG-PUSCH transmitted in the SUL. For example, when the same HARQ process IDs are configured between the SUL and the NUL and cross-CC retransmission is performed, if NACK is fed back based on A/N of CG-DFI for the CG-PUSCH transmitted in the SUL, a retransmission operation may be performed using CG resources configured in the NUL.

5-5. Method of Respectively Configuring a Bitmap for SUL and a Bitmap for NUL in CG-DFI A bitmap for SUL may be configured only for HARQ process IDs allocated for a CG-PUSCH. For example, bitmaps for HARQ-ACK feedback are separately configured for SUL and for NUL in CG-DFI such that a bitmap for SUL is configured only for HARQ process IDs allocated for the CG-PUSCH.

5-6. In NUL, the CG Function of Unlicensed Bands Such as CG-UCI can be Turned Off to Operate in the Same Manner as the CG of Licensed Bands.

However, the above-described methods 5-2 to 5-6 may be applicable to a case in which a carrier on which a PUSCH is transmitted is dynamically switched with a physical layer signal such as DCI. In addition, the above-described methods may be applicable even when the relationship between NUL and SUL is reversed, that is, when NUL is replaced with SUL and SUL is replaced with NUL in the above-described methods.

In the above, configuring/indicating the PUSCH transport carrier as a NUL or a SUL may mean the following.

When the UL/SUL indicator field is present in DCI format 0_0 and the upper layer parameter pusch-Config is not set to both NUL and SUL, a UE ignores the UL/SUL indictor in DCI format 0_0 and transmits a PUSCH scheduled in DCI format 0_0 in UL or SUL on a carrier in which the upper layer parameter pucch-Config is set. That is, if the carrier on which pucch-Config is set is a NUL, the PUSCH transport carrier may be the NUL.

When the UL/SUL indictor field is not present in DCI format 0_0 and the upper layer parameter pucch-Config is set, a PUSCH scheduled in DCI format 0_0 in UL or SUL is transmitted on a carrier in which pucch-Config is set. That is, if the carrier on which pucch-Config is set is a NUL, the PUSCH transport carrier may mean NUL.

When the UL/SUL indicator field is not present in DCI format 0_0 and the upper layer parameter pucch-Config is not set, UL scheduled in DCI format 0_0 in the UL or SUL is transmitted on the last carrier on which a PRACH is transmitted. That is, if the last carrier on which the PRACH is transmitted is a NUL, the UL transport carrier may mean NUL.

In cases other than the above three cases, if the UL/SUL indictor field is present in DCI format 0_0, UL may be transmitted on a carrier indicated by the UL/SUL indicator.

Figure 10:
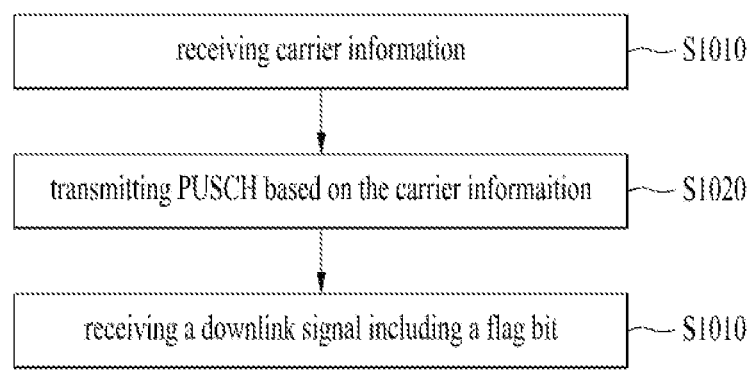
FIG. 10 to FIG. 12 illustrate a signal transmission process according to an embodiment of the present disclosure.
Figure 11:
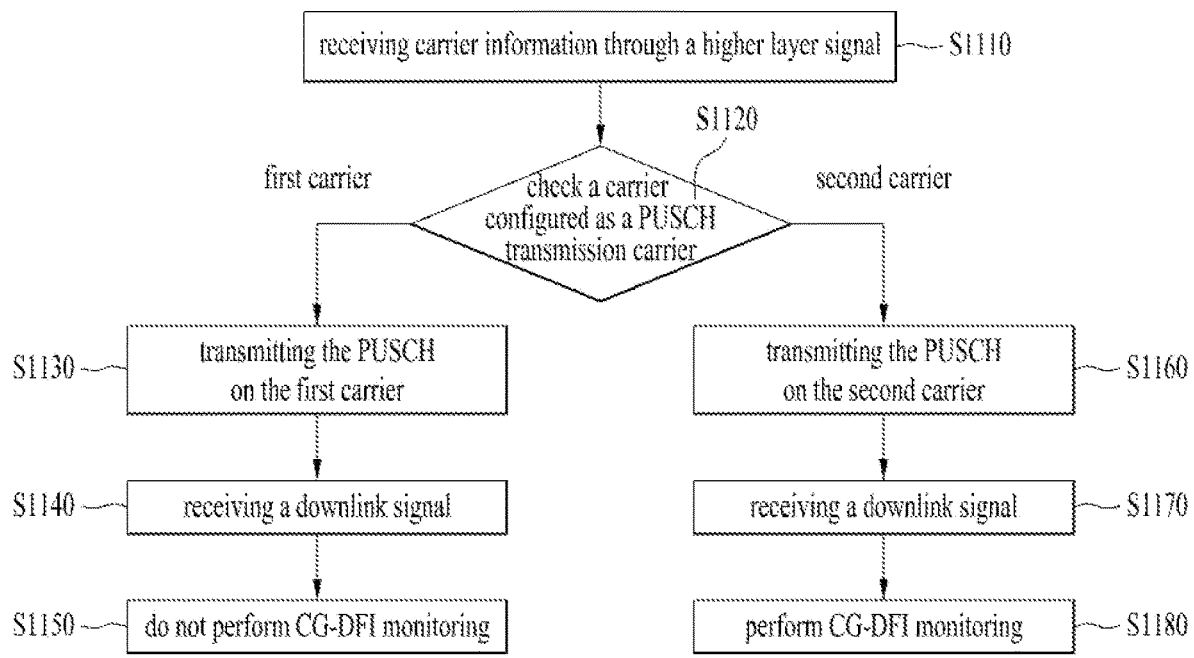
Figure 12:
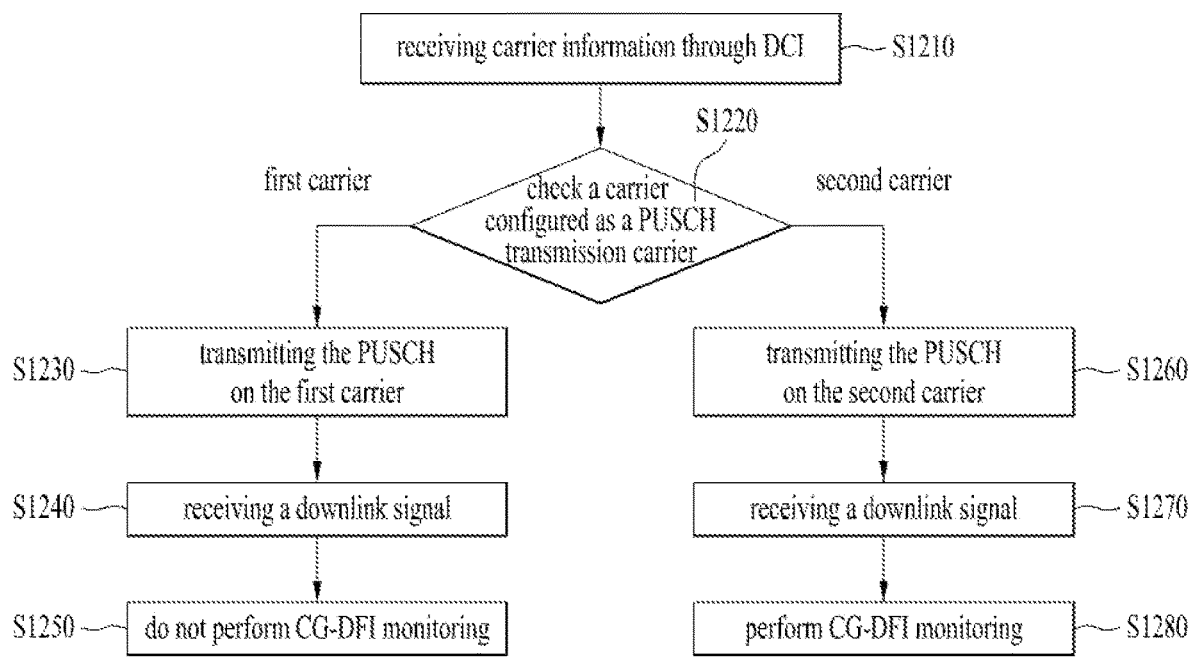

FIG. 10 to FIG. 12 show a signal transmission process according to an embodiment of the present disclosure.

Referring to FIG. 10, a UE may receive carrier information indicating a carrier on which a PUSCH will be transmitted from a base station (S1010). The carrier information may be received semi-statically via a higher layer signal or dynamically via DCI. The carrier on which the PUSCH will be transmitted may be a first carrier configured in a first band or a second carrier configured in a second band different from the first band. For example, the first band may be a licensed band and the first carrier may be a SUL configured in the licensed band. The second band may be an unlicensed band, and the second carrier may be a NUL configured in the unlicensed band. The UE may transmit the PUSCH on a carrier indicated by the carrier information (S1020). Thereafter, the terminal may receive a downlink signal including a flag bit indicating whether or not feedback information on a CG-PUSCH is included (S1030). The feedback information on the CG-PUSCH may be CG-DFI, and the flag bit may be a DFI flag bit. Whether the UE monitors CG-DFI may be different depending on the type of a carrier configured as a carrier on which the PUSCH will be transmitted and a method of transmitting carrier information to the UE.

Signal transmission processes will be described in detail with reference to FIGS. 11 and 12. FIG. 11 is a signal transmission process when carrier information is received through a higher layer signal, and FIG. 12 is a signal transmission process when carrier information is received through DCI.

Referring to FIG. 11, the UE may receive carrier information through a higher layer signal (S1110), check which carrier is configured as a carrier for PUSCH transmission (S1120), and transmit a PUSCH on the configured carrier (S1130 and S1160). A CG may be configured for the first carrier and the second carrier, and thus the transmitted PUSCH may be a CG-PUSCH. For example, if the first carrier (SUL) is configured as a PUSCH transport carrier, the CG-PUSCH is transmitted on the first carrier (SUL), and if the second carrier (NUL) is configured as the PUSCH transport carrier, the CG-PUSCH is transmitted on the second carrier (NUL). However, the CG-PUSCH transmitted on the first carrier, which is a licensed band, does not include CG-UCI, and the CG-PUSCH transmitted on the second carrier, which is an unlicensed band, may include CG-UCI. Thereafter, the UE receives a downlink signal (S1140 and S1170), and whether to monitor CG-DFI may be determined based on a flag bit included in the downlink signal and the type of the carrier on which the PUSCH is transmitted (S1150 and S1180). For example, when the PUSCH is transmitted on the first carrier, the flag bit is bit 0, and the UE does not monitor feedback information on the CG-PUSCH. When the PUSCH is transmitted on the second carrier, the flag bit is bit 1 and the UE monitors feedback information on the CG-PUSCH based on the value of the flag bit, "1".

Referring to FIG. 12, the UE may dynamically receive carrier information through DCI (S1210), check which carrier has been configured as a carrier for PUSCH transmission (S1220), and transmit the PUSCH on the configured carrier (S1230 and S1260). For example, the PUSCH is transmitted on the first carrier (SUL) if the first carrier (SUL) is configured as a PUSCH transport carrier, and the PUSCH is transmitted on the second carrier (NUL) if the second carrier (NUL) is configured as a PUSCH transport carrier. The PUSCH transmitted on the second carrier may be a CG-PUSCH including CG-UCI. Thereafter, the UE receives a downlink signal (S1240 and S1270), and whether to monitor CG-DFI may be determined based on a flag bit included in the downlink signal and the type of the carrier on which the PUSCH is transmitted (S1250 and S1280). For example, when the PUSCH is transmitted on the first carrier, the UE does not expect the flag bit to be "ON", and thus the UE does not monitor feedback information on the CG-PUSCH. When the PUSCH is transmitted on the second carrier, the flag bit is 1 bit and the UE monitors feedback information on the CG-PUSCH based on the value of the flag bit, "1". In this case, the UE may monitor only the value of a bitmap index corresponding to a HARQ process ID for the second carrier (NUL).

Each of the above-described proposed methods may be combined and applied together as long as they are not mutually arranged with other proposed methods.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 13:
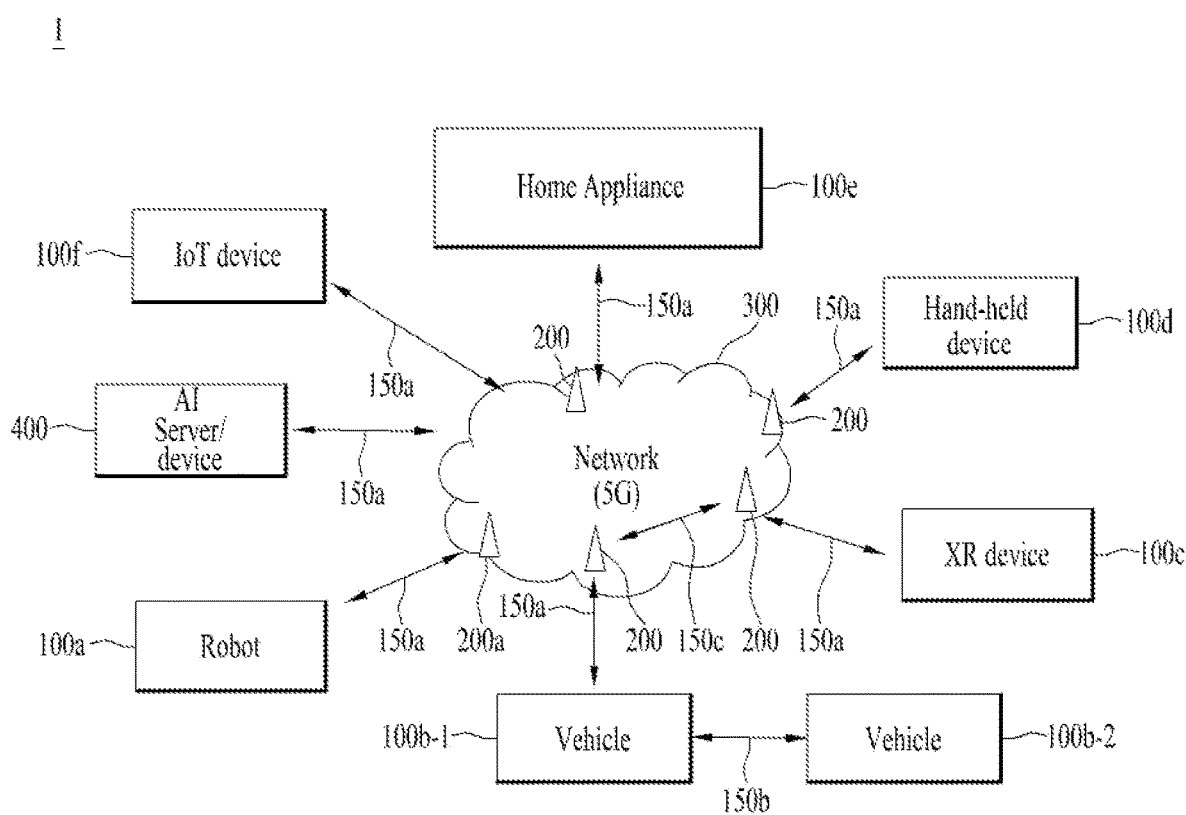
FIG. 13 illustrates an exemplary communication system applied to the present disclosure.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 14:
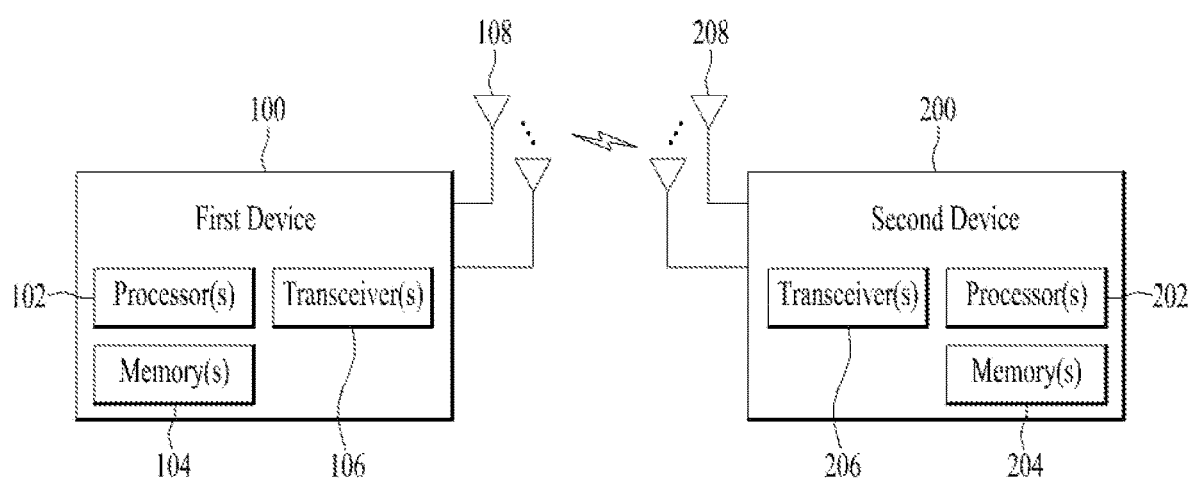
FIG. 14 illustrates an exemplary wireless device applicable to the present disclosure.

FIG. 14 illustrates wireless devices applicable to the present disclosure.

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 15:
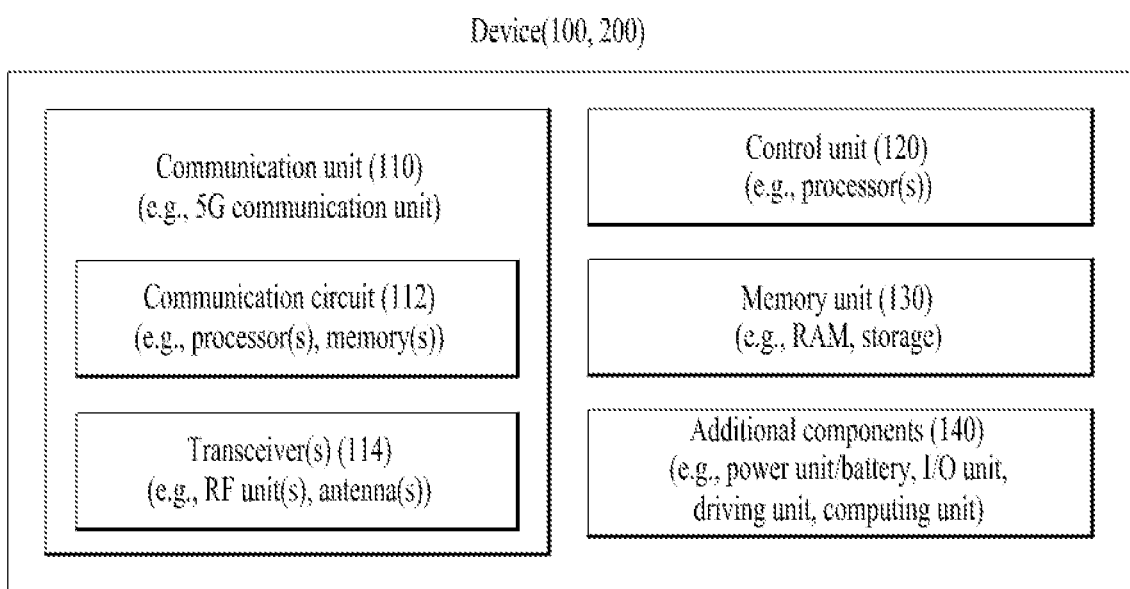
FIG. 15 illustrates another exemplary wireless device applicable to the present disclosure.

FIG. 15 illustrates another example of a wireless device applied to the present disclosure. The wireless device may be implemented in various forms according to a use case/service (refer to FIG. 13).

Referring to FIG. 15, wireless devices 100 and 200 may correspond to the wireless devices 100 and 200 of FIG. 14 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcasting terminal, a hologram device, a public safety device, an MTC device, a medical device, a FinTech device (or a finance device), a security device, a climate/environment device, the AI server/device (400 of FIG. 13), the BSs (200 of FIG. 13), a network node, or the like. The wireless device may be mobile or fixed according to a use case/service.

In FIG. 15, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 16:
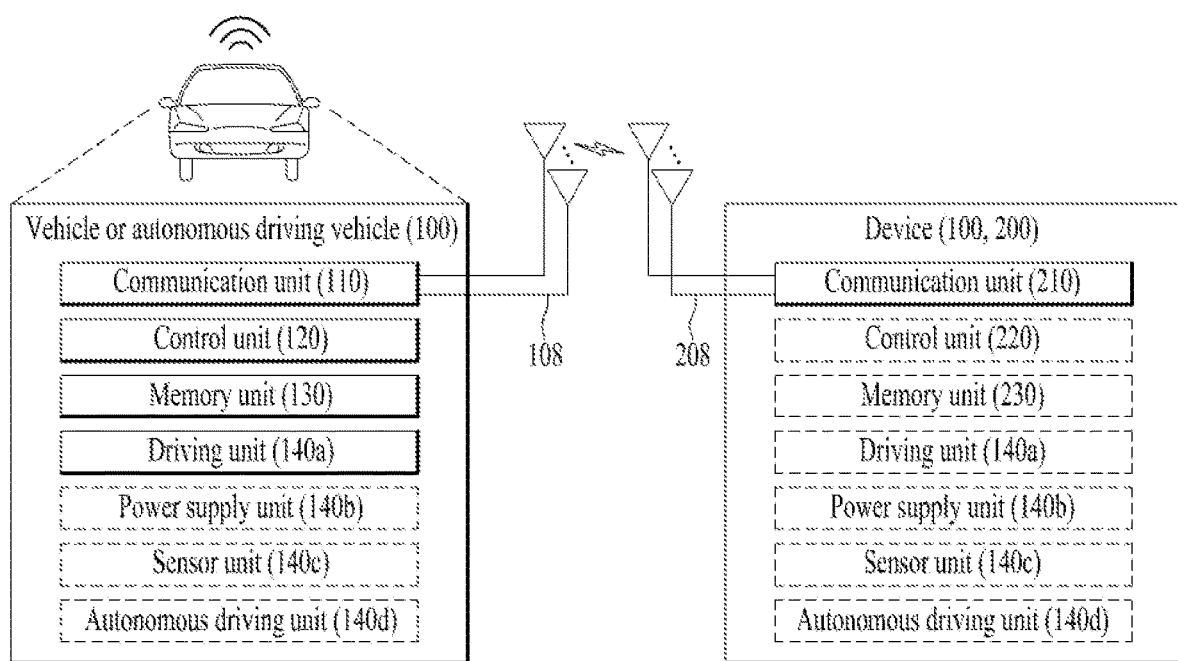
FIG. 16 illustrates an exemplary vehicle or autonomous driving vehicle applicable to the present disclosure.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other devices in a mobile communication system.

What is claimed is:

1. A method performed by a UE in a wireless communication system, comprising:

receiving information on a frequency band on which a physical uplink shared channel (PUSCH) will be transmitted;

transmitting the PUSCH on the frequency band based on the information; and receiving a downlink signal including a flag, wherein the downlink signal does not include feedback information on a configured grant (CG)-PUSCH based on the flag being 0 bit, and the downlink signal includes the feedback information on the CG-PUSCH based on the flag being 1 bit.

2. The method of claim 1, wherein the PUSCH is transmitted on a licensed band based on the information indicating the licensed band and the information being received through a higher layer signal, and wherein the flag is 0 bit.

3. The method of claim 2, wherein the UE does not monitor the feedback information on the CG-PUSCH.

4. The method of claim 1, wherein, based on the information indicating an unlicensed band and being received through a higher layer signal, the PUSCH is a CG-PUSCH transmitted on the unlicensed band, and wherein the flag is 1 bit.

5. The method of claim 4, wherein the UE monitors the feedback information on the CG-PUSCH based on a value of the flag being "1".

6. The method of claim 1, wherein, based on the information indicating a licensed band and being received through downlink control information (DCI), the PUSCH is transmitted on the licensed band, and the UE does not monitor the feedback information on the CG-PUSCH.

7. The method of claim 1, wherein, based on the information indicating an unlicensed band and being received through downlink control information, the PUSCH is a CG-PUSCH transmitted on the unlicensed band, and the UE monitors the feedback information on the CG-PUSCH.

8. The method of claim 7, wherein monitoring the feedback information on the CG-PUSCH comprises monitoring a bitmap index corresponding to a hybrid automatic repeat and request (HARD) process ID for the unlicensed band.

9. A UE used in a wireless communication system, comprising:

at least one transceiver;

at least one processor; and at least one computer memory operatively coupled to the at least one transceiver and the at least one processor, and when executed, causing the at least one transceiver and the at least one processor to perform operations comprising:

receiving information on a frequency band on which a physical uplink shared channel (PUSCH) will be transmitted;

transmitting the PUSCH on the frequency band based on the information; and receiving a downlink signal including a flag, wherein the downlink signal does not include feedback information on a configured grant (CG)-PUSCH based on the flag being 0 bit, and the downlink signal includes the feedback information on the CG-PUSCH based on the flag being 1 bit.

10. The UE of claim 9, wherein the UE includes an autonomous vehicle capable of communicating with at least one of a network and an autonomous vehicle other than the UE.

11. A device for a UE, comprising:

at least one processor; and at least one computer memory operatively coupled to the at least one processor and, when executed, causing the at least one processor to perform an operation comprising:

receiving information on a frequency band on which a physical uplink shared channel (PUSCH) will be transmitted;

transmitting the PUSCH on the frequency band based on the information; and receiving a downlink signal including a flag, wherein the downlink signal does not include feedback information on a configured grant (CG)-PUSCH based on the flag being 0 bit, and the downlink signal includes the feedback information on the CG-PUSCH based on the flag being 1 bit.

12. A non-transitory processor-readable medium storing one or more instructions for causing at least one processor to perform an operation comprising:

receiving information on a frequency band on which a physical uplink shared channel (PUSCH) will be transmitted;

transmitting the PUSCH on the frequency band based on the information; and receiving a downlink signal including a flag, wherein the downlink signal does not include feedback information on a configured grant (CG)-PUSCH based on the flag being 0 bit, and the downlink signal includes the feedback information on the CG-PUSCH based on the flag being 1 bit.

* * * * *